(12) United States Patent
Joshi et al.

(10) Patent No.: US 7,382,759 B2
(45) Date of Patent: *Jun. 3, 2008

(54) SYSTEM AND METHOD FOR ASSOCIATING DIFFERENT TYPES OF NODES WITH ACCESS POINT NODES IN A WIRELESS NETWORK TO ROUTE DATA IN THE WIRELESS NETWORK

(75) Inventors: Avinash Joshi, Orlando, FL (US); Surong Zeng, Altamonte Springs, FL (US); William Vann Hasty, Jr., Lake Mary, FL (US); Charles R. Barker, Jr., Orlando, FL (US); Robin U. Roberts, Orlando, FL (US); Keith J. Goldberg, Casselberry, FL (US)

(73) Assignee: MeshNetworks, Inc., Maitland, FL (US)

( * ) Notice: Subject to any disclaimer, the term of this patent is extended or adjusted under 35 U.S.C. 154(b) by 364 days.

This patent is subject to a terminal disclaimer.

(21) Appl. No.: 11/221,136

(22) Filed: Sep. 7, 2005

(65) Prior Publication Data
US 2006/0098612 A1 May 11, 2006

Related U.S. Application Data

(60) Provisional application No. 60/611,845, filed on Sep. 22, 2004, provisional application No. 60/607,729, filed on Sep. 7, 2004.

(51) Int. Cl.
*H04Q 7/24* (2006.01)
*H04L 12/28* (2006.01)
(52) U.S. Cl. ............... 370/338; 370/338; 370/400; 370/406; 370/351; 370/256; 709/220; 709/242
(58) Field of Classification Search ........... 370/338, 370/328, 400, 406, 351, 256; 709/220, 242
See application file for complete search history.

(56) References Cited

U.S. PATENT DOCUMENTS 5,943,322 A 8/1999 Mayor (Continued)

OTHER PUBLICATIONS

U.S. Appl. No. 11/221,135, filed Sep. 7, 2005, Avinash Joshi.
C. Perkins & E. Belding-Royer, "Ad Hoc On Demand Distance Vector (AODV) Routing," IETF Experimental RFC, Jul. 2003.

(Continued)

*Primary Examiner*—William Trost
*Assistant Examiner*—Ariel Balaoing
(74) *Attorney, Agent, or Firm*—Randi L. Karpinia; Joseph J. Buczynski

(57) ABSTRACT

A method and system for routing data in a wireless network (400) that enables all nodes (106, 402, 404, 406, 408) to find routes to each other even if the nodes (106, 402, 404, 406, 408) are non-meshed which are incapable of operating as a router to route packets received from other nodes (106, 402, 404, 406, 408), and for associating and reassociating the non-meshed and meshed nodes with other meshed nodes (106, 402, 404, 406, 408). The non-meshed nodes (STA 13-STA 15) request association with one of the meshed nodes (AP5) which are capable of performing packet routing, to request that the meshed node (AP5) with which the non-meshed node (STA 13) is associating operate as a proxy node to route packets between the associated non-meshed node (STA 13) and other meshed or non-meshed nodes (106, 402, 404, 406, 408). Some of the meshed nodes (106) further operate as intelligent access points (106) to provide the non-meshed nodes (STA 13-STA 15) and other meshed nodes (402) with access to other networks, such as the Internet (402), as well as to effect the association and reassociation of the non-meshed and meshed nodes (106, 402, 404, 406, 408).

22 Claims, 8 Drawing Sheets

U.S. PATENT DOCUMENTS

| | | |
|---|---|---|
| 6,807,165 B2 | 10/2004 | Belcea |
| 6,873,839 B2 | 3/2005 | Stanforth |
| 7,251,238 B2 * | 7/2007 | Joshi et al. ................ 370/338 |
| 2002/0058502 A1 | 5/2002 | Stanforth |
| 2004/0143842 A1 | 7/2004 | Joshi |

OTHER PUBLICATIONS

S. Bradner, "Key words for use in RFCs to Indicate Requirement Levels." Request for Comments (Best Current Practice) 2119, Internet Engineering Task Force, Mar. 1997.

J. Manner, et al., "Mobility Related Terminology" (work in progress). draft-manner-seamoby-terms-02.txt, Jul. 2001.

* cited by examiner

SYSTEM AND METHOD FOR ASSOCIATING DIFFERENT TYPES OF NODES WITH ACCESS POINT NODES IN A WIRELESS NETWORK TO ROUTE DATA IN THE WIRELESS NETWORK

This application claims the benefit of U.S. Provisional Application Nos. 60/607,729, filed Sep. 7, 2004, and 60/611, 845, filed Sep. 22, 2004, the entire content of both being incorporated herein by reference.

CROSS-REFERENCE TO RELATED APPLICATION

Related subject matter is disclosed in U.S. Pat. No. 7,251,238 of Avinash Joshi et al. entitled "System and Method for Routing Data Between Different Types of Nodes in a Wireless Network", granted on Jul. 31, 2007, filed on even date herewith, the entire content being incorporated herein by reference.

FIELD OF THE INVENTION

The present invention relates generally to a system and method for associating different types of nodes in a communication network with proxy nodes that can route packets between the different type of nodes and other nodes in the network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel"22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

Most of today's wireless standards specify a network with a star topology in which a single node, called the Access Point (or Master Node) is responsible for providing communication to other nodes which are typically called stations (or slave nodes). The stations are typically described as being "associated with" the Access Point. Typically the Access Points or Master Nodes are connected to other Access Points or Master Nodes and rest of the Internet.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
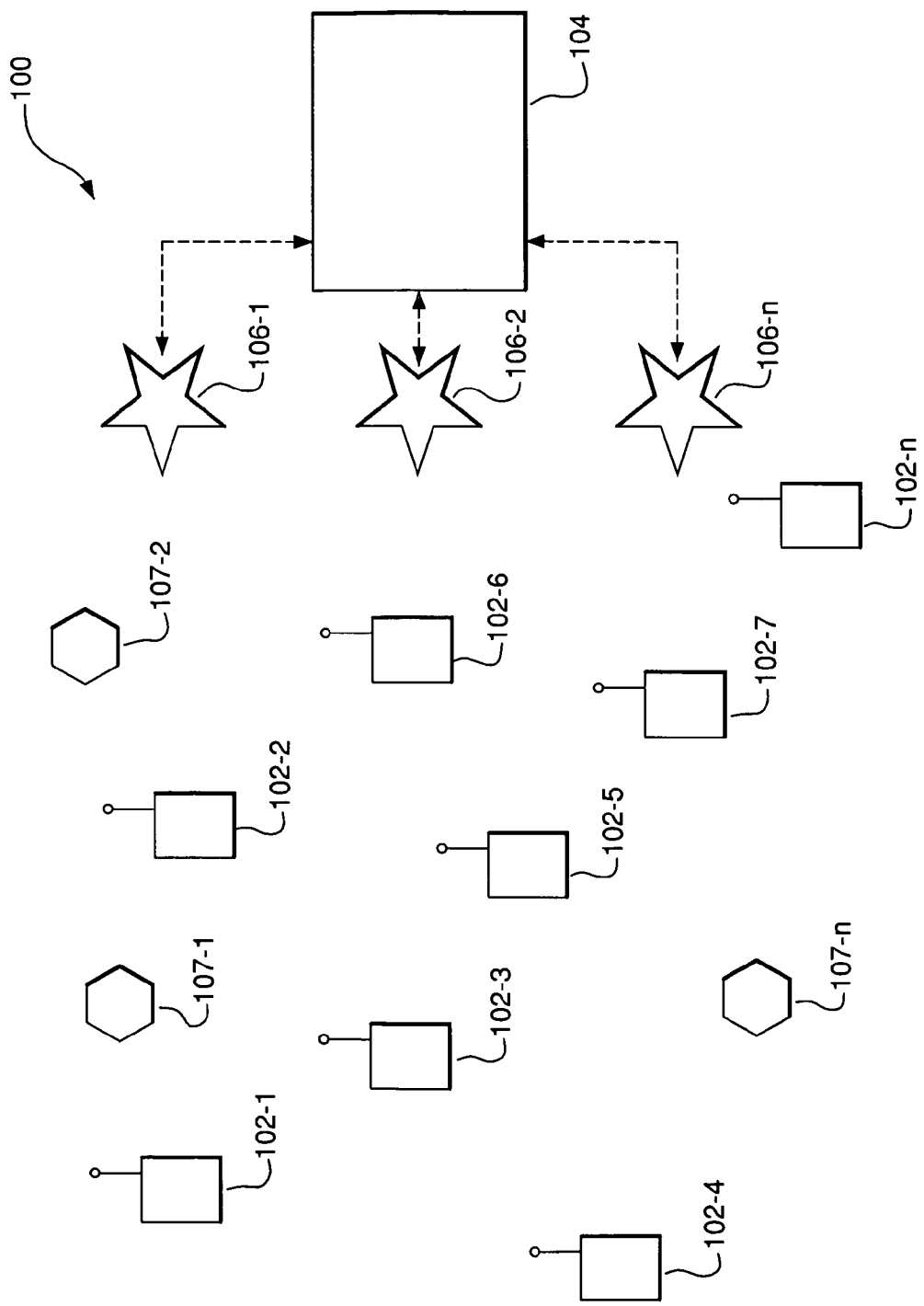
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for routing data in a wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for routing data in a wireless network described herein. The non-processor circuits may include, but are not limited to, a radio receiver, a radio transmitter, signal drivers, clock circuits, power source circuits, and user input devices. As such, these functions may be interpreted as steps of a method to perform data routing in a wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will now be discussed, the present invention provides a system and method that enables all nodes in a wireless network, in particular, an ad-hoc multi-hopping wireless network, to find routes to each other even if those nodes do not participate in routing packets.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of intelligent access points (IAPs) 106-1, 106-2, . . . 106-n (referred to generally as nodes 106, intelligent access points 106, or IAPs 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107," or simply "nodes."

Figure 2:
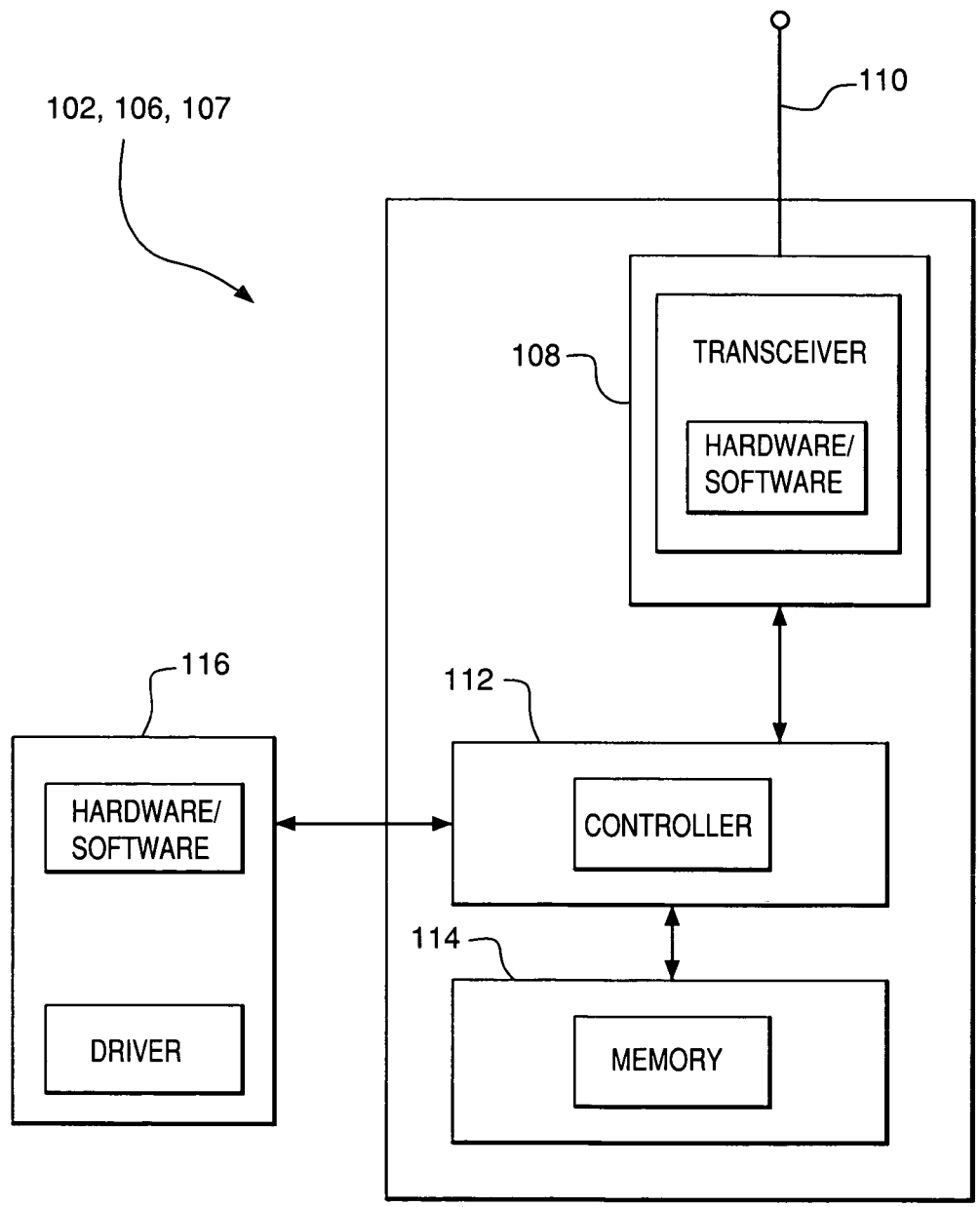
FIG. 2 is a block diagram illustrating an example of a mobile node employed in the network shown in FIG. 1.

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. Pat. No. 7,072,650, and U.S. Pat. Nos. 6,807,165 and 6,873,839, referenced above. As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
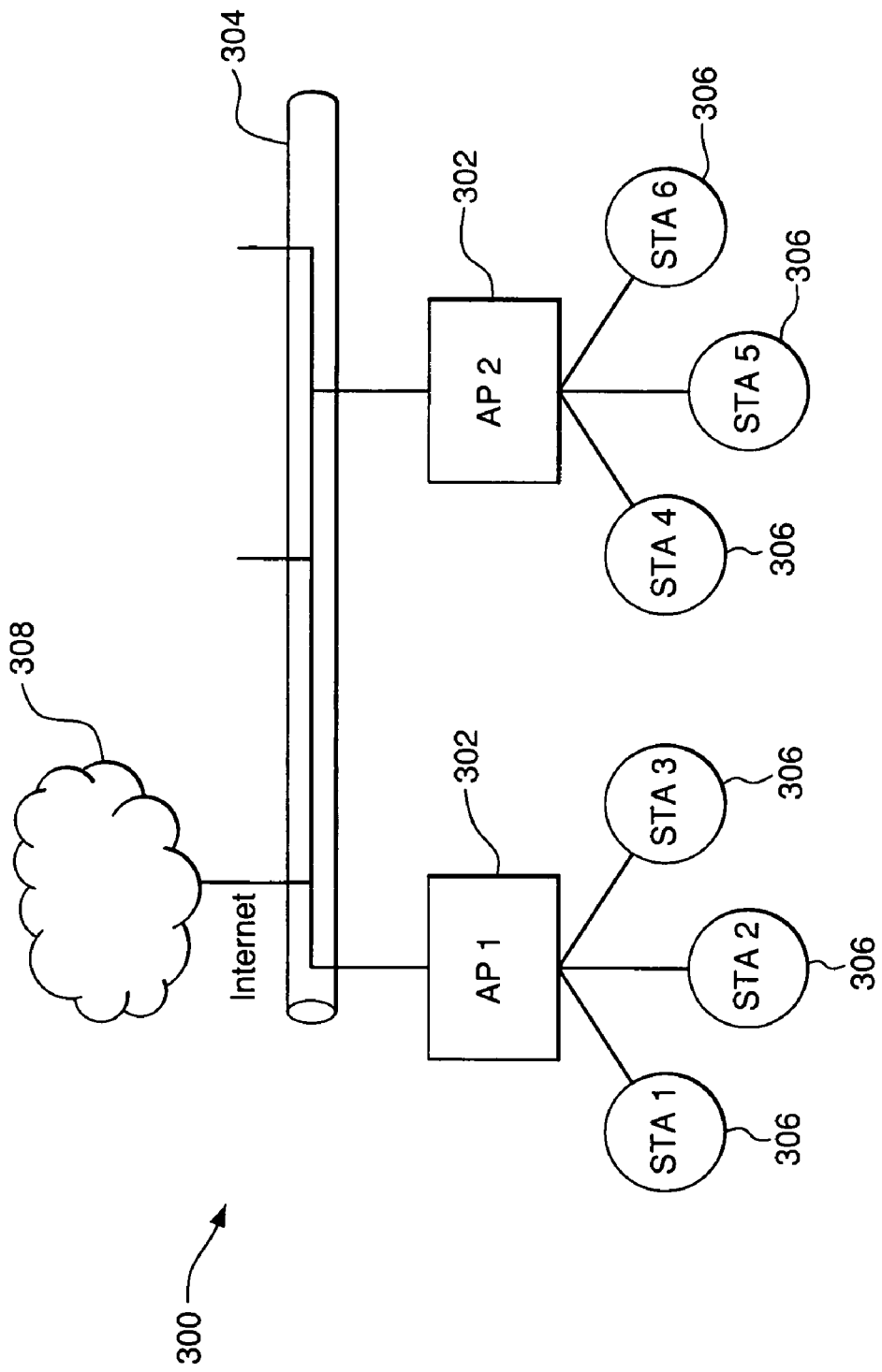
FIG. 3 is an example of the connectivity of typical network operating in accordance with the International Electrical and Electronic Engineers (IEEE) 802.11 Standard.

FIG. 3 illustrates a typical network 300 operating in accordance with the International Electrical and Electronic Engineers (IEEE) 802.11 Standard, such as version IEEE Std. 802.11-1997, which can be referred to as "an 802.11 network". The network includes a first and second access points 302 AP 1 and AP 2, respectively. AP 1 and AP 2 are connected to one another via wired Ethernet 304. Wireless stations 306 (STA 1, STA 2, and STA 3) are associated with AP 1, while wireless stations 306 identified as STA 4, STA 5, and STA 6 are associated with AP 2. As shown in FIG. 3, stations 306 STA 1 through STA 6 access the Internet 308 through their associated APs. Conventionally, these APs connect to the Internet through a backhaul infrastructure, such as a wired Ethernet.

An embodiment of the invention avoids the need for the backhaul infrastructure through the use of intelligent access points (IAPs 106 as shown in FIG. 1) that are connected to the wired portion (e.g., fixed network 104) of the network 100. An IAP 106 is responsible for providing Internet connectivity to those devices that are associated with that IAP 106. Devices are associated with the IAP 106 using a binding protocol as described below.

To assist in describing the various embodiments of the invention, the following definitions are provided:

Meshed Device—A device operating according to an embodiment of the invention, which may follow a standard wireless protocol such as IEEE 802.11 or IEEE 802.15. These devices are responsible for forwarding packets to/from the proxy devices which are associated with them.

Non-Meshed Device—A device following a standard wireless protocol such as IEEE 802.11 or IEEE 802.15 but not participating in any kind of routing. These devices are "proxied" by meshed devices, which establish routes for them.

Figure 4:
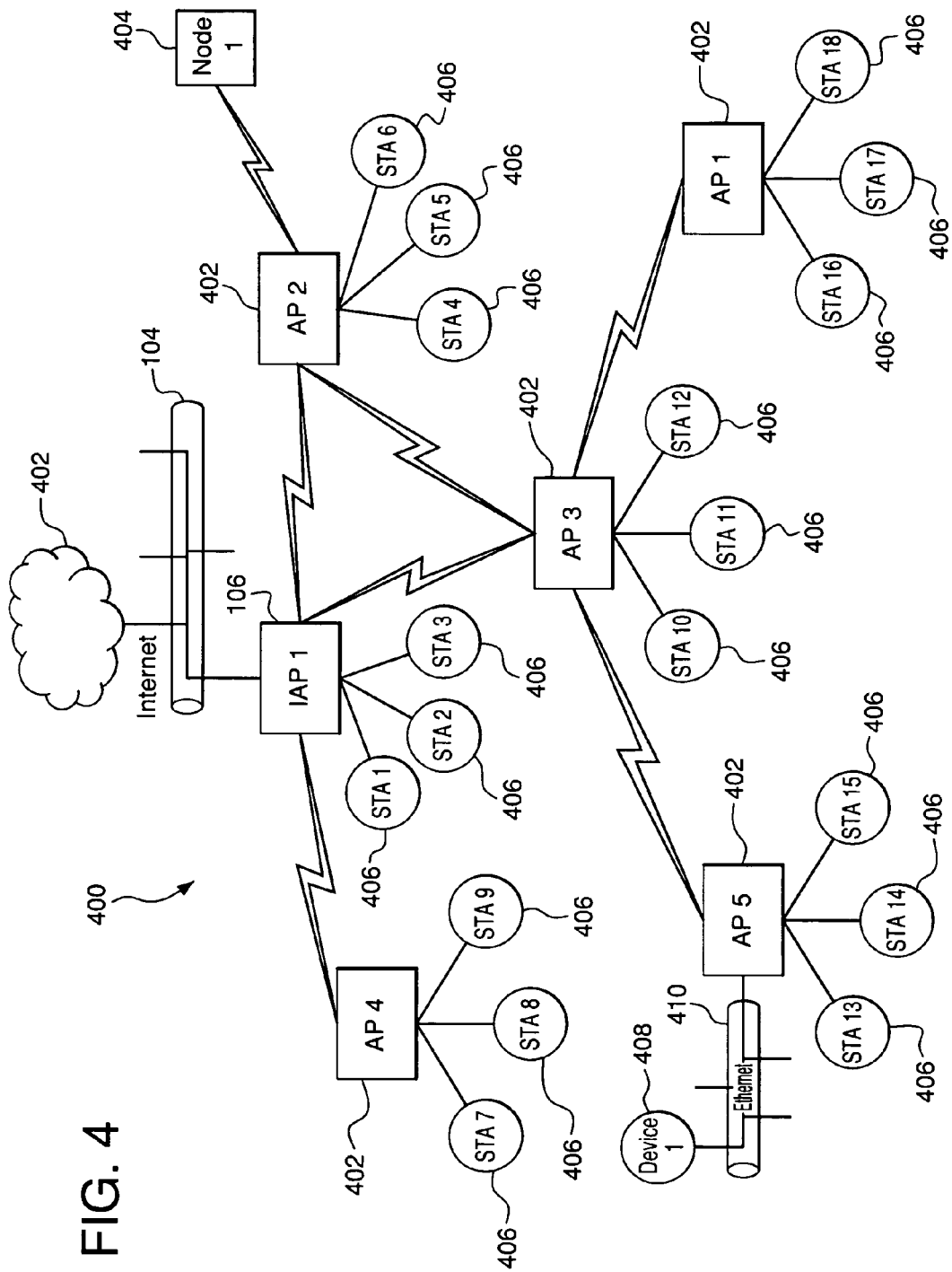
FIG. 4 is a block diagram of wireless network as shown in FIG. 1 configured in accordance with an embodiment of the present invention.

FIG. 4 illustrates the use of the network 100 as shown in FIG. 1 according to an embodiment of the invention, wherein like components are given the same identification number. The network 100 as shown in this example (and identified as network 400) includes at least one intelligent access point 106 identified as IAP 1, which is communicatively linked to the Internet 402 via wired connection (such as fixed network 104). The network 400 further includes access points 402, identified as AP 1, AP 2, AP 3, AP 4, and AP 5. The network 400 also includes at least one node 404 (identified as Node 1) which is a meshed device but does not proxy any other device. All of the nodes 404 in the network 400 are associated with IAP 1. The network 400 further includes wireless stations 406 STA 1-STA 18, which are each associated with the nearest access point 402 (e.g., AP 1 through AP 5). For example, STA 13, STA 14, and STA 15 are each associated with access point AP 5. Some of the stations 406 are mobile nodes 102 (or routers 107) as discussed above with regard to FIG. 1 In this example, wireless stations 406 identified as STA 13, STA 14, and STA 15 are non-meshed devices, and do not participate directly in routing. The network 400 also includes a device 408 identified as Device 1, which is associated with the access point AP 5 and is connected to AP 5 via Ethernet 410.

In accordance with the embodiment shown in FIG. 4, the APs 1 though 5 and IAP 1 operate in compliance with the IEEE 802.11 standard for access points, but also have added functionality as described herein for the invention. Further in accordance with the embodiment illustrated in FIG. 4, the stations 406 STA 1-STA 18 operate in compliance with the IEEE 802.11 standard. Thus, the stations 406 STA 1-STA 18 use the standard association model to associate with the APs in their vicinity. The APs use a wireless link to communicate with other APs. The APs can use the same wireless link that they use to communicate to the STAs or can use an alternate link for communicating with other APs. The network shown in FIG. 4 also may be used in conjunction with the Wireless Distribution System described in the IEEE 802.11-1997 Standard.

In the example network 400 shown in FIG. 4, when STA 13 needs to communicate with STA 16, the most efficient route to communicate (with respect to minimum hops) in this example will be through AP 3. It should be noted that when the STAs follow standard IEEE 802.11 protocol, they may only communicate with their associated AP in "Associated Mode." However, to determine the most "efficient" route in accordance with an embodiment of the invention, the APs employ a routing protocol and refer to tables. The tables will now be described.

Figure 5:
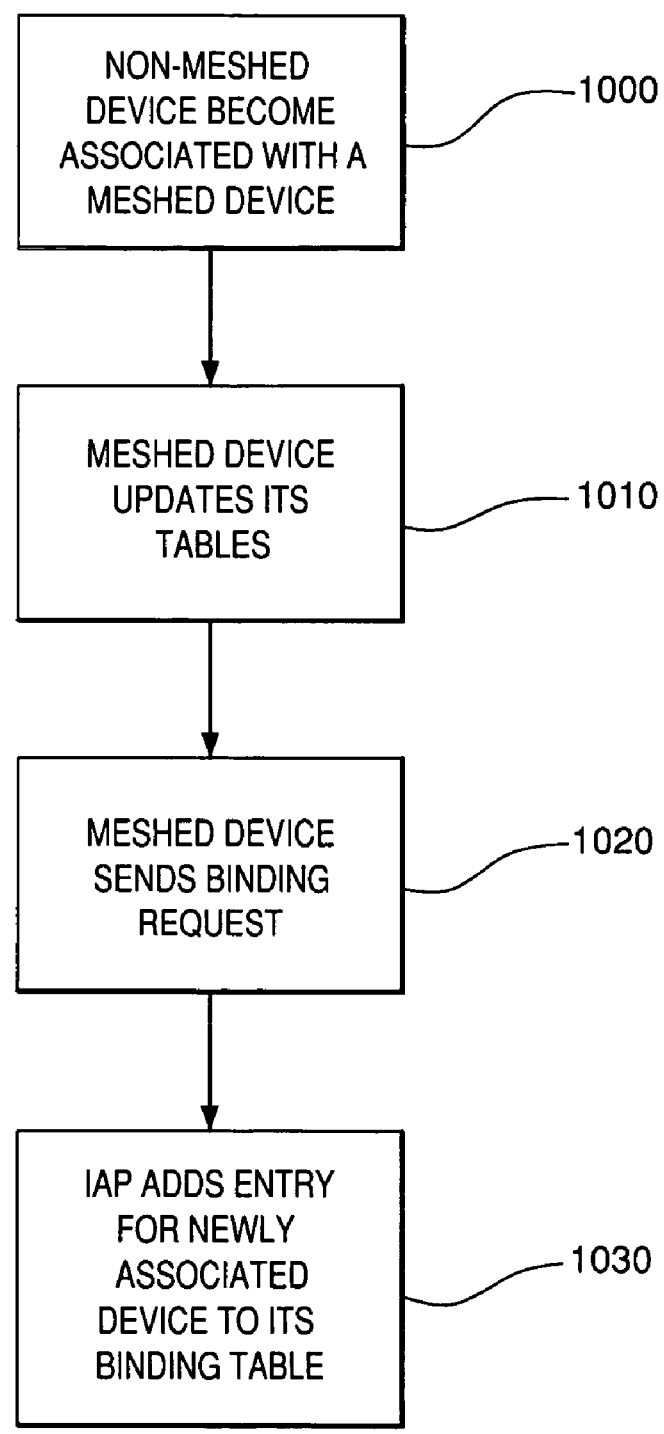
FIGS. 5 through 7 are flowcharts illustrating examples of operations for updating the binding and association tables of nodes in the wireless network shown in FIG. 4 in accordance with an embodiment of the present invention.
Figure 6:
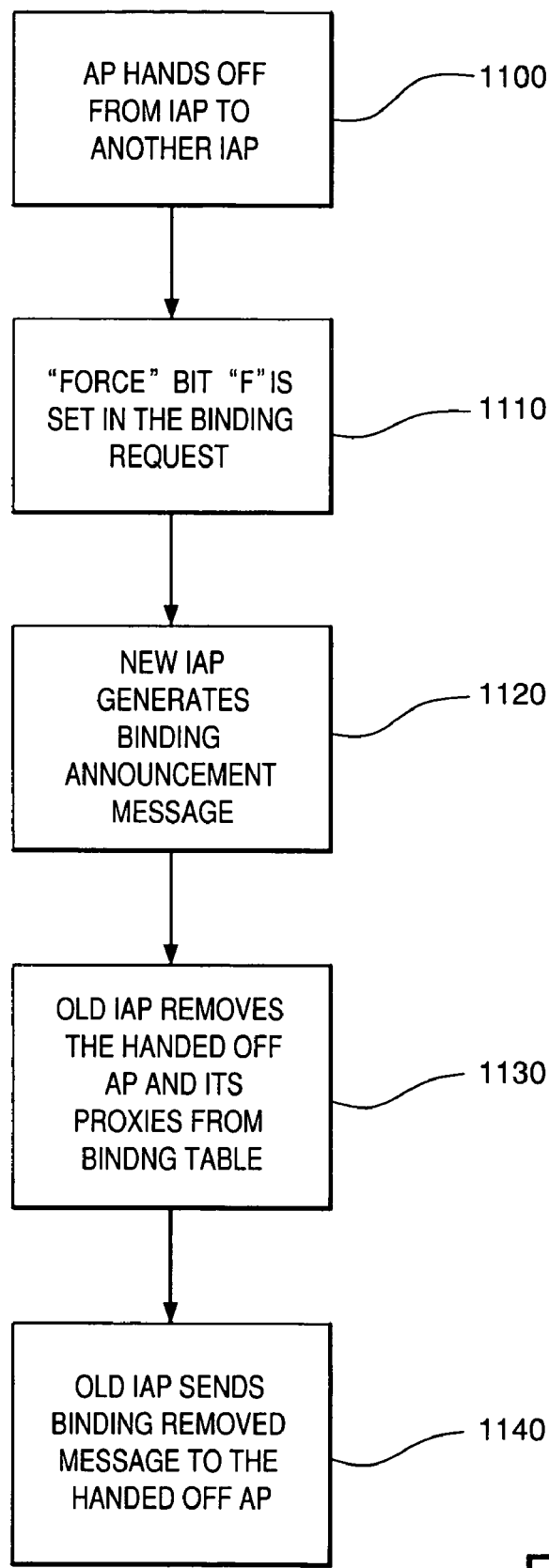
Figure 7:
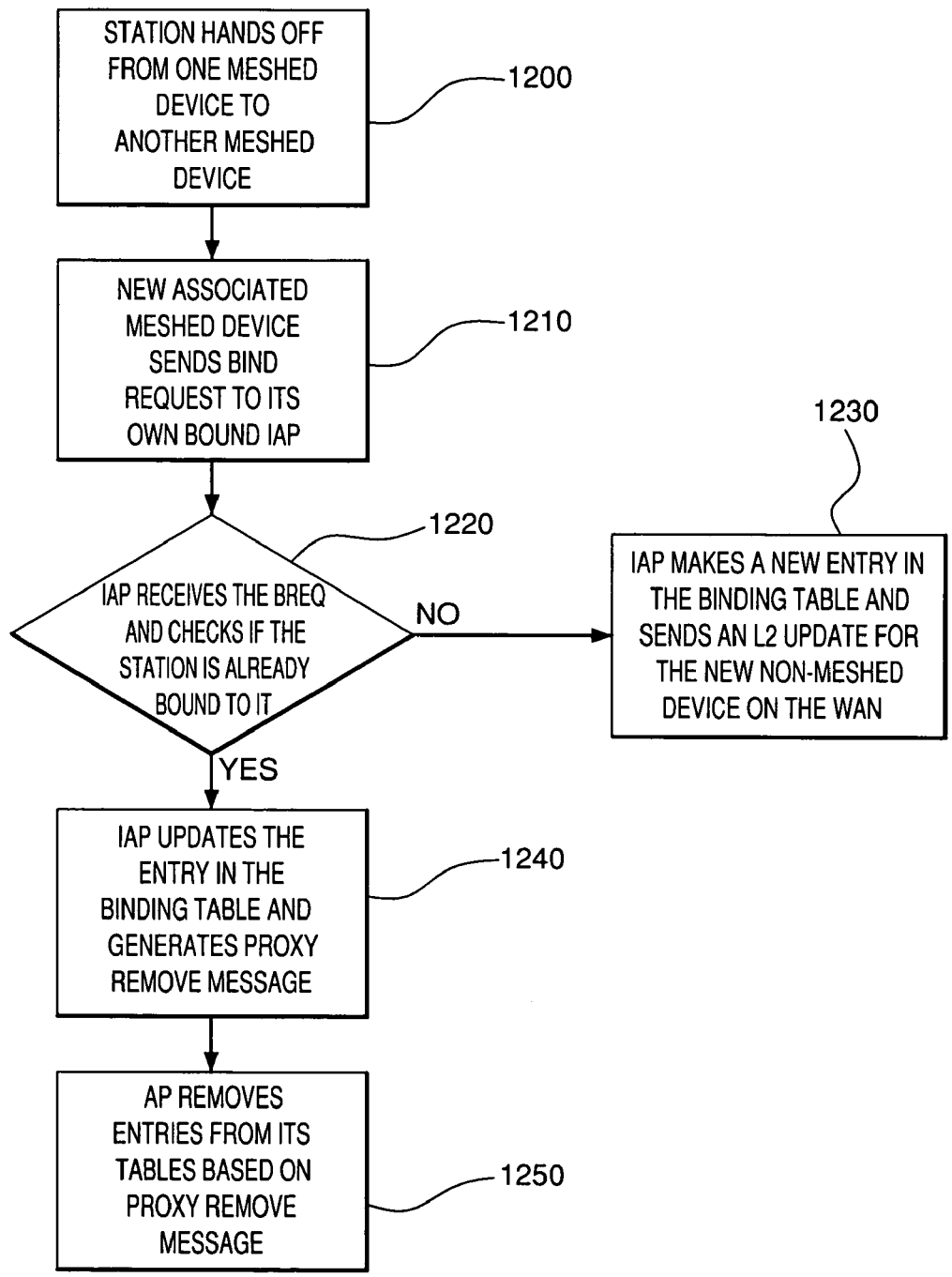

Referring again to FIG. 4, each AP maintains an "association table" or "proxy table" that contains an entry for each device that is associated with the AP (i.e. each device that is being proxied by the AP). An AP can also have nodes or devices (associated with it through a wired Ethernet port (for example AP 5 has Device 1 associated with it) or through some other wired/wireless protocol like IEEE 802.15, Token Ring, or the like as can be appreciated by one skilled in the art. An association table of an AP may also contain entries for non-meshed devices that are associated with other APs but use that AP as an intermediate node to communicate with other devices in the network 400. Each entry in the association table may include one or more of the following pieces of information:

Device media access control (MAC) Address (if MAC addressing scheme is used)
Device IP address (if EP addressing scheme is used)
Device ID (if an addressing scheme other than IP or MAC is used)
Static or Dynamic Entry (i.e. whether the entry is static or dynamic)
Associated AP address (the address can be MAC address, IP address or other device ID depending on which addressing scheme is used—this entry is used if node is maintaining association information for non-meshed nodes associated with other AP. This is useful in case a four (4) addressing scheme is used in the network)
Expiration time of the entry Each IAP 106 also maintains a "binding table." The binding table contains an entry for each AP that is associated with (also referred to herein as "bound to") the IAP (i.e., each meshed device that is bound to the IAP 106). Each entry in the binding table may include one or more of the following pieces of information:

MAC Address of meshed device (e.g. an AP, if MAC addressing scheme is used)
IP address of meshed device (e.g. an AP, if IP addressing scheme is used)
Device ID (if an addressing scheme other than IP or MAC is used)
List of devices associated with the meshed device (e.g. an AP) along with the expiration time of each device
Expiration time of the meshed device (e.g. an AP) entry The process of the creation and updating of the binding table and association table will now be described with regard to the flowcharts shown in FIGS. 5-7. As shown in FIG. 5, when a non-meshed device (e.g., STA 13) is associated with a meshed device (e.g. AP 5) in step 1000, the meshed device (e.g., AP 5) adds an entry into its association table or proxy table for this non-meshed device in step 1010. At the same time, or within a certain time period, the meshed device AP 5 sends a Binding Request (BREQ) to its bound IAP 106 (IAP 1) to report the new updates in step 1020. Upon receiving the BREQ, the IAP 1 adds an entry into its binding table for this new associated non-meshed device in step 1030.

The BREQ includes, but not limit to, the following information:

Bound IAP's address (if the address can be MAC address, IP address or other device ID depending on which addressing scheme is used)
Originator's MAC address (the meshed device, e.g. AP, the address can be MAC address, IP address or other device ID depending on which addressing scheme is used)
List of devices associated with the originator meshed device
Old bound IAP's MAC address (the address can be MAC address, IP address or other device ID depending on which addressing scheme is used)

As shown in the flowchart in FIG. 6, when a meshed device AP (e.g., AP 5) hands off from one IAP (e.g., IAP 1) to another IAP (not shown) in step 1100, the "force" bit "F" will be set in the BREQ in step 1110. Upon receiving the BREQ with the force bit set, the IAP with which the meshed device is becoming associated generates the Bind Announcement (BANN) message to the wired backbone (e.g., fixed network 104) in step 1120 to inform the old IAP to which the meshed device was bound in the network.

The BANN includes, but not limit to, the following information:

IAP's address (the new IAP that the meshed device is bound to; the address can be MAC address, IP address or other device ID depending on which addressing scheme is used)
Originator's address (it should be the meshed device's address; the address can be MAC address, IP address or other device ID depending on which addressing scheme is used)
Old IAP's address (the old IAP that the meshed device is bound to; the address can be MAC address, IP address or other device ID depending on which addressing scheme is used)

If the Old IAP's address in the BANN message is the address of the receiving IAP, the old IAP (IAP 1) removes the Originator node (the meshed device which just handed off, in this example AP 5) and all its proxies from IAP 1's binding table in step 1130. IAP 1 also sends a Bind Removed (BRED) message to the originator node (AP 5) to acknowledge the action in step 1140. The new IAP will also send one L2 update packet for each device that was bound recently on the WAN to update the entries in bridge/switch.

When other IAPs on the WAN get these L2 update packets they check whether the source address in L2 update packet is in their binding table. If it is and the source is not proxied by the IAP directly, the IAP will generate a Proxy Remove (PREM) message and unicast it to the meshed node with which the L2 source node was associated.

When a non-meshed device hands off from one meshed device to another, which may be bound to same or different IAP, combination of messages like the Bind Request, Layer 2 (L2) update and Proxy Remove (PREM) are generated to update the proxy/association table promptly as discussed in more detail below. As shown in FIG. 7, when a non-meshed device (e.g. STA 13) moves from one AP (e.g. AP 5) and gets associated with another AP (e.g. AP 1) in step 1200, the association triggers the AP 1 to send a new BREQ message in step 1210 to the IAP indicating the new non-meshed node (STA 13) which got associated to it. When the IAP 1 receives a BREQ, IAP 1 first checks its binding table in step 1220 to see if it had an entry for STA 13. If no entry is found, IAP will assume that the device is new and will create a new entry for it and generate an L2 update packet on the WAN in step 1230 otherwise it will update the existing entry to reflect the new association but will not send any L2 update packet. Since in this example the station has moved between APs which are bound to the same IAP, the IAP already have one entry for STA 13 and hence will simply update the entry in step 1240 and will not send the L2 update. While updating the relevant entry, the IAP generates a PREM and unicasts the PREM to the meshed device (AP 5) with which the non-meshed node (STA 13) was associated with in step 1240.

The PREM includes, but not limit to, the following information:

IAP's address (the address can be MAC address, IP address or other device ID depending on which addressing scheme is used)

Intended meshed device's address (the address of the meshed device that needs to remove its proxy)

List of proxy devices needs to be removed (The list of nodes proxied by/associated with the intended meshed device that need to be removed)

Upon receiving the PREM message, the meshed device (AP 5) removes the entries from its proxy/association table according to the list of proxy devices in the PREM message in step 1250.

As noted above, to make efficient use of the architecture of FIG. 4, the APs use a routing protocol to determine the optimal routes to a destination. Various types of routing protocols that can be used will now be described. These protocols can generally be classified as either (a) table-driven (or proactive) routing protocols; or (b) on-demand (or reactive) routing protocols.

In Table-driven routing protocols, each node (e.g., APs, IAP, STAs) maintains one or more tables containing routing information to every other node in the network 400. All nodes update these tables so as to maintain a consistent and up-to-date view of the network. When the network topology changes the nodes propagate update messages throughout the network in order to maintain consistent and up-to-date routing information about the whole network. These routing protocols vary in the method by which the topology change information is distributed across the network and the number of necessary routing-related tables.

One table-driven protocol that may be used is distance vector routing (or any variant of it for mobile ad-hoc networks (MANETs) such as destination sequenced distance vector (DSDV) routing). According to an embodiment of the present invention, distance vector routing is modified as follows. Instead of advertising routes to other APs, APs also include the information about the devices which are associated with respective APs.

Another table-driven protocol that may be used is link state routing (or any variant of it like optimized state link routing (OLSR)). According to an embodiment of the invention, link state routing is modified as follows. Instead of sending link updates about neighboring APs, all APs also include information about the devices associated with neighboring APs. Thus after routing convergence, all APs know about routes to all other APs and also know about the devices associated with those APs.

On demand routing protocols create routes only when desired by the source node. When a node requires a route to a destination, that node initiates a route discovery process within the network 400. This process is completed once a route is found or all possible route permutations have been examined. Once a route has been established, it is maintained by some form of route maintenance procedure until either the destination becomes inaccessible along every path from the source or until the route is no longer desired.

As can be appreciated by one skilled in the art, Ad-hoc On-demand Distance Vector (AODV) and dynamic source routing (DSR) are on-demand routing protocols that provide quick convergence and lower overhead, and allow the intermediate nodes to reply for a destination if they have a valid route. However, in the network 400 as shown in FIG. 4, only meshed devices participate in routing in this example, and the real source and destination can be a non-meshed device which does not maintain any sequence number as required by AODV. An example would be if STA 15 tried to communicate with Device 1. The non maintenance of Sequence Number can lead to inefficient routing using the standard implementation of DSR, and especially for AODV since, if the destination node is not a meshed device, then only the device with which the destination node is associated can reply.

In an embodiment of the invention, standard on-demand routing protocols such as AODV and DSR are modified so that all meshed devices send the list of devices that are associated with them to the IAP. This list can be sent periodically or in response to an event. For example, each AP can be configured such that it sends the list whenever a new node becomes associated with it. The IAP stores this information in its binding table. Each meshed device also informs the IAP when it adds or removes a device from its association table.

Figure 8:
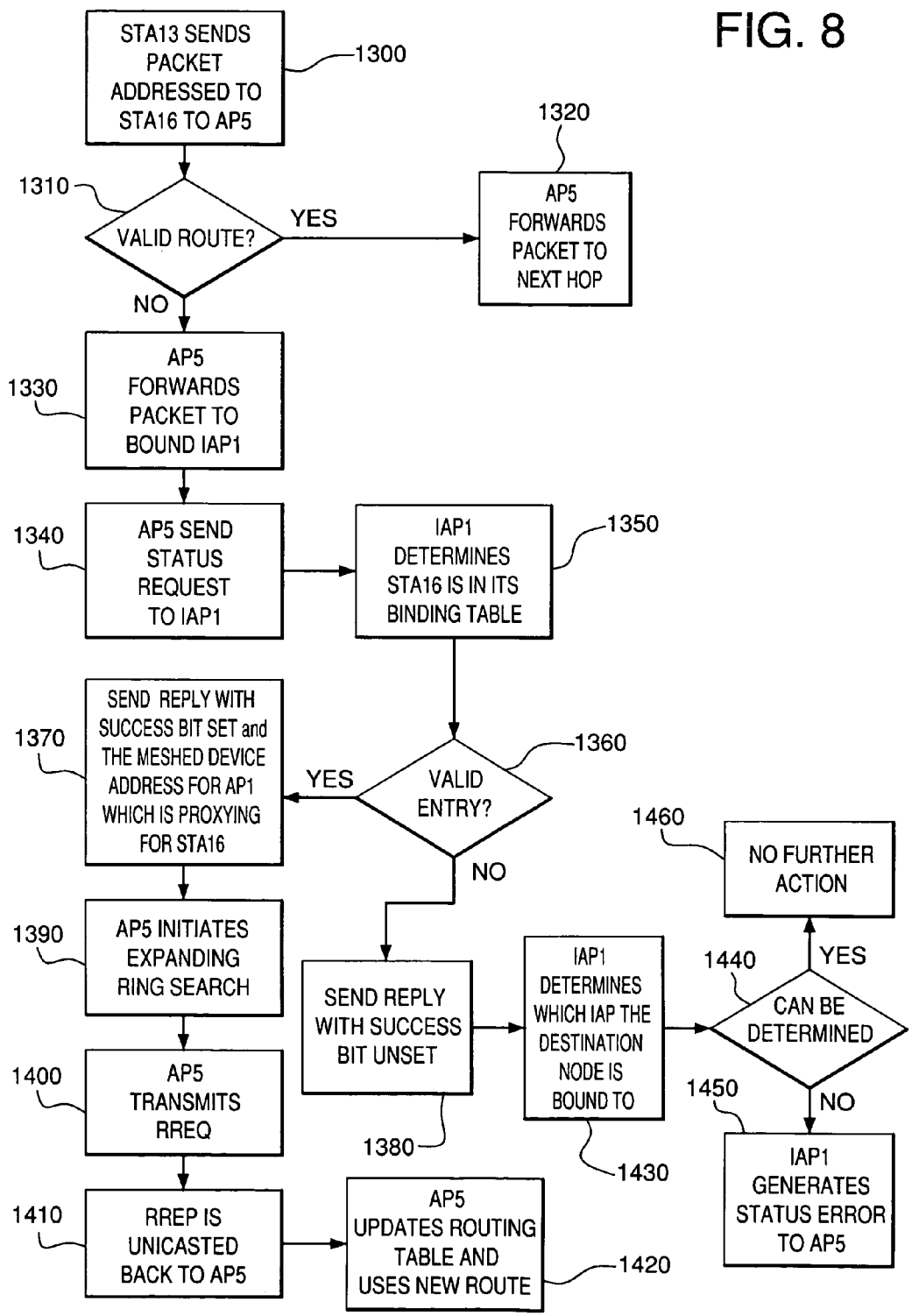
FIG. 8 is a flowchart illustrating an example of operations performed for sending a packet between nodes in the network show in FIG. 4 according to an embodiment of the present invention.

An example of a manner in which a station 406 STA 1-STA 18 sends a packet to another station 406 STA 1-STA 19 in an embodiment of the present invention will now be described with reference to the flowchart in FIG. 8. The sending station 406 (e.g. STA 13), which can also be referred to as the "source node" in this example, first sends the packet addressed to the destination node (e.g., STA 16 in this example) to STA 13's associated AP (AP 5) in accordance with the IEEE 802.11 standard in step 1300. The packet at this point includes the source and the destination address. Upon receiving the packet, the AP 5 uses one of the methods described below and as described in U.S. application Ser. No. 10/863,710, which was filed on Jun. 7, 2004 and is incorporated herein by reference in its entirety.

For example, the AP 5 first references its routing table to determine whether it has a valid route to the destination in step 1310. If the AP 5 has a valid route in its routing table, the AP 5 forwards the packet to the next hop towards the destination in step 1320. If the AP 5 determines that there is no valid route to the destination in its routing table, the AP 5 forwards the packet to the IAP 1 with which it is bound in step 1330, and sends a special message, called a Status Request, to the IAP 1 in step 1340. The contents of the Status Request message may include, but are not limited to:

1. Address of the originator device (in this example, the address of the AP)
2. Address of the destination node
3. Find bit (described below)

The AP 5 then determines the route to the IAP 1 in step 1350. The AP 5 can accomplish this task in a variety of ways, some of which are described in U.S. patent application Ser. No. 10/755,346, filed Jan. 13, 2004, which is incorporated herein by reference in its entirety.

Upon receiving this Status Request, the IAP 1 consults its binding table to see if the destination node (e.g., STA 16 in this example) is present in the table and is unexpired in step 1360. It should be noted that all of the information contained in the binding table can be combined with that in the routing table. The combined data structure can be used both as a routing table and as a binding table. After checking the binding table, the IAP 1 sends a message called a Status Reply back to the AP 5. The contents of the Status Reply message may include, but are not limited to:

1. Address of the originator device (in this example, the address of the IAP)
2. Address of the destination device
3. Success bit
4. Type of destination (meshed or non-meshed device)
5. The address of the meshed device that is proxying the destination device (if the destination device is non-meshed)
6. Found bit (described below)

If the IAP 1 finds a valid entry in its binding table in step 1360, it sends the Status Reply message back to the AP with the success bit set in step 1370. If the IAP 1 does not find a valid entry in its binding table, it sends the Status Reply message back to the AP 5 with the success bit unset in step 1380. The Status Reply message also includes the type of the destination device, that is, either meshed or non-meshed. If the destination device is non-meshed, the IAP 1 also includes the address of the meshed device that is proxying the destination device.

Upon receiving the Status Reply with success bit set, the AP 5 initiates an expanding ring search, in accordance with, for example, AODV, in step 1390. In initiating this search, the AP 5 transmits a Route Request (RREQ) packet in step 1400. The maximum time-to-live (TTL) can be equal to the number of hops to the IAP 1. In this example, the maximum TTL can also be a function of the number of hops to the IAP 1, or can be a function of something other factor as can be understood by one skilled in the art. The "Destination Address" field of the RREQ packet contains the address of the destination itself, if the Type field indicates that the destination is a meshed device. Or, if the Type field indicates that the destination device is a non-meshed device, the "Destination Address" field contains the address of the meshed device proxying the destination device as reported by the IAP 1. At this point, since the RREQ packet contains the address of a meshed device in the "Destination Address" field, any node having a valid route to the "Destination Address" can reply. Thus, the RREQ packet does not need to reach all the way to the end (the destination). The route is made available when some meshed device receives the RREQ packet, finds the appropriate route in its routing table, and unicasts a Route Reply (RREP) back to the origination of the RREQ (back to the AP 5) in step 1410.

Two variations can be used for setting up and/or updating the route entries on the route between the source meshed device and the destination meshed device. One variation is that the intermediate meshed device only maintains the routes to the destination meshed device and the source meshed device. In this variation, each following data packet should carry six addresses: initiator address, terminator address, source meshed device address, destination meshed device address, current hop device address, next hop device address. If the real source and the real destination are not meshed devices, then the initiator address and the terminator address will be the real source non-meshed device and the real destination non-meshed device, respectively, the source meshed device is the one proxying for the source non-meshed device, and the destination meshed device is the one proxying for the destination non-meshed device, respectively. If the real source and the real destination are meshed devices, then the initiator address is same as the source meshed device address, and the terminator address is same as the destination meshed device address.

A second variation is that the intermediate meshed device maintains the routes to the source meshed device and the destination meshed device, as well as the proxy/association information for non-meshed devices which proxied by the source and destination meshed devices. When the RREP is sent back from the destination meshed device to the source meshed device, besides creating/updating the route entry for the destination meshed device, each intermediate meshed device also updates its proxy/association table if the real source and/or real destination are not meshed devices. The intermediate node creates an entry for the non-meshed device, and records which meshed device the non-meshed device is associated with according to the address information in the RREP. In this variation, only four addresses are needed for the following data packets. They are the initiator address, terminator address, current hop device address, and next hop device address. When the intermediate meshed node forwards the data packet originating from a non-meshed source device and terminating at a non-meshed destination device, the intermediate node first consults its proxy/association table for the non-meshed destination device to get the destination meshed device which is proxying for the non-meshed destination device. Next, the intermediate node checks the route table for the route entry for the destination meshed device to get the next hop device address.

Upon receiving the RREP in step 1410, the AP 5 updates its routing table and starts using the newly found route in step 1420. Thus, the flood of RREQ packets is stopped at the level where the intermediate node has a valid route to the destination or to the meshed device proxying the destination, since the RREQ packets do not need to travel all the way to the destination. This significantly reduces the overhead, as such networks can encompass large areas. This also eliminates the possibility of an AP doing a network-wide Route Discovery, which can consume considerable overhead, especially when the AP is searching for a destination node that does not even exist in the network.

The AP 5 continues to send packets to the IAP 1 while the AP 5 is waiting for the Status Reply or Status Error message. Thus, no packets need to be buffered at the AP 5. If the Status Reply comes with success bit unset as in step 1380, the AP continues to send packets to the IAP 1 unless the IAP 1 receives a special message called Status Error. An example of a sequence of events that can lead to the generation of a Status Error message is described below.

The IAP 1 upon receiving the Status Request message probes the binding table in step 1360 as discussed above to find if it has any entry for the destination mentioned in the Status Request. If the probe is unsuccessful, the IAP 1 tries to locate the IAP with which the destination is bound in step 1430. This can be a route look up in the routing table of the IAP host or an ARP cache look up, or employ some other suitable method. If the IAP 1 determines in step 1440 that it cannot find the IAP with which the destination is bound and hence cannot forward the packet, it generates the Status Error message to the source node (e.g., STA 13) in step 1450.

The possible contents of the Status Error message can include, but are not limited to, the following.

1. Address of the IAP sending the error message
2. Address of the source node which generated the status request
3. Address of the destination node mentioned by the source node The same information can also be conveyed through any other messages which are flowing between the devices. However, if the IAP with which the destination is bound can be determined in step 1440, the no further action is taken on the part of this IAP as in step 1460.

It should be noted meshed device 404 (e.g., Node 1 in FIG. 4) could also perform all of the steps that the AP 5 performed in the above example, with the exception that Node 1 does not "proxy" any other device. Thus, in the above example, the true "source node" was a device associated with the AP 5 (e.g., STA 13), although as far as the rest of the network 400 was concerned, the source node was the AP 5 itself. If Node 1 wishes to communicate with a station 406 in the network 400, Node 1 would be the true "source node" as well as the source node recognized by the network.

There can be several variations to the procedure described above. These variations will be described in the following paragraphs. The generic term "source node" will now be used, but it is understood that the source node may be one of the APs or a meshed device that does not serve as an AP for any other node (e.g. Node 7).

In a first variation, in place of sending the Status Request message and data packet to the IAP simultaneously, the source node (e.g, AP 5) can also buffer the packets while waiting for the Status Reply or Status Error. This is advantageous when there is one direct optimal route between the source node and the destination, in which case sending packets via the IAP 1 would be inefficient. However, this buffering may delay the sending of packets, and can require additional buffer space.

In a second variation, the source node can first do a local Route Discovery for the destination before sending the packets to the IAP 1, or before sending any Status Request message. For example, the source node can do an expanding ring search with the maximum TTL equal to the number of hops to the IAP 1. The maximum TTL can also be a function of the number of hops to the IAP 1 or a function of something else. In this case, the source node doesn't know the type of the destination (meshed or non-meshed). The source node just puts the real destination address in "Destination Address" field of the RREQ message. The overhead involved in this process is dependent on the type of the destination device. If the destination device is a meshed device then, as above, any node having a valid route to it can reply, If the destination node is a non-meshed device, then it is the responsibility of the meshed device that is proxying the destination (e.g. the associated AP) to reply to the RREQ packet. Thus, when a RREQ message is received, each node should check its association table and reply if the destination is one of the nodes associated with it. The RREP packet also needs to be modified in this case, as it may potentially need to carry two addresses in the reply. If the real destination is a non-meshed device, then the RREP message should contain the address of the device proxying the destination and the address of the destination itself. If the source node receives a RREP message, the source node will then start sending the packets to the destination. If no reply is received after one or more attempts, the source node can safely determine that the destination node is not in its vicinity, determined by the maximum TTL it has used. At this point the source node typically has to use the IAP 1 to send the packets to the destination. This may be achieved through one of the following two techniques.

In a first technique, the source node can start sending packets to the IAP 1 once the source node determines that the local Route Discovery has failed. The source node will stop if a Status Error message is received from the IAP 1 indicating that the destination node does not exist in the network currently.

In a second technique, the source node can send a special message to the IAP 1, or the Status Request message with the find bit set to determine if the destination node exists in the network. The IAP 1, upon receiving the message, queries its host routing table or ARP cache, or employs some other suitable method, to find the IAP 1 to which the destination node is bound. If the IAP 1 is successful in finding the IAP 1 to which the destination node is bound, and hence the destination node itself, the IAP 1 indicates this by sending a Status Reply message with the found bit set to the source node. Otherwise the IAP 1 sends a Status Error message to the source node.

If a Status Reply message is received by the source node with the found bit set, then the source node starts sending the packets to the IAP 1 for the IAP 1 to forward to the appropriate IAP 1 to which the destination node is bound. If the Status Error message is received, then the source node can declare the destination to be unreachable for the time being and try again later. In this variation, latency is involved in finding the route, and packets may need to be buffered.

In a third variation, in place of using special messages like Status Request, Status Reply, and Status Error, the nodes can use other messages to convey the same information. For example, the source node generally needs to send DNS and/or ARP queries to the IAP 1 to which it is bound to determine the IP address, MAC address, and so forth. The IAP 1, upon receiving such messages, can send a special kind of message to indicate if the destination node is bound with that IAP 1 or not, or whether the destination node even exists in the network. The ARP on DNS replies can also be modified to include this information. Even the data packet itself can replace the status request. For example, the first data packet to a particular destination received at the IAP 1 can be treated like a Status Request message. In this variation, special Status messages will not be needed. As noted above, there can be several ways to discover such information. In accordance with an embodiment of the invention, the IAP 1 can be leveraged for the purpose of providing replies for server centric services like ARP, DNS DHCP and so on.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for communicating in a wireless communication network, the method comprising:
providing at least one non-meshed node which is adapted to communicate packets in the network;
providing at least one meshed node, adapted to communicate packets in the network and further adapted to route packets between other meshed and non-meshed nodes in the network;
operating the non-meshed node to send to the meshed node a request to associate with the meshed node; and
upon receiving the request, operating the meshed node as a proxy for the non-meshed node associated therewith to route packets between the associated non-meshed node and at least one of a different non-meshed node and another meshed node in the network.

2. A method as claimed in claim 1, wherein:
the step of providing at least one meshed node comprises providing a plurality of said meshed nodes, and operating at least one of the plurality of meshed nodes as an intelligent access point to provide other meshed nodes and non-meshed nodes associated therewith access to another network.

3. A method as claimed in claim 2, further comprising:
when the non-meshed node becomes associated with the meshed node, operating the meshed node to send a message to the intelligent access point with which the meshed node is associated to inform the intelligent access point that the non-meshed node has become associated with the meshed node.

4. A method as claimed in claim 3, wherein:
the intelligent access point comprises a table; and the method further comprises operating the intelligent access point to update the table with information pertaining to the non-meshed device based on the message received from the meshed device.

5. A method as claimed in claim 4, wherein:
the message comprises an address of the non-meshed node.

6. A method as claimed in claim 2, further comprising:
when the non-meshed node changes its association from the meshed node to a different meshed node that is associated with the intelligent access point, operating the intelligent access point to send message to the meshed node from which the non-meshed node changed its association to inform the meshed node of the change of association.

7. A method as claimed in claim 6, wherein:
the intelligent access point operating step comprises operating the intelligent access point to unicast the message to the meshed node from which the non-meshed node changed its association.

8. A method as claimed in claim 2, further comprises:
when the non-meshed node changes its association from the meshed node to a different meshed node associated with a different intelligent access point, operating the different intelligent access point to send message to the intelligent access point from which the reassociated non-meshed node changed its association to inform the intelligent access point of the change of association.

9. A method as claimed in claim 8, wherein:
the intelligent access point comprises a table; and
the method further comprises:
when the intelligent access point receives the message from the different access point, operating the intelligent access point to update its table to remove information pertaining to the reassociated non-meshed node based on the message received from the different intelligent access point.

10. A method as claimed in claim 1, wherein:
the step of operating the meshed node as the proxy for the non-meshed node comprises maintaining information pertaining to a route between the non-meshed node associated therewith and said at least one different non-meshed node and another meshed node in the network.

11. A method as claimed in claim 10, further comprising:
operating the meshed node to maintain information pertaining to other meshed nodes and their respective associated non-meshed nodes as obtained from routing messages.

12. A wireless communication network, comprising:
at least one non-meshed node which is adapted to communicate packets in the network; and
at least one meshed node, adapted to communicate packets in the network and further being adapted to route packets between other meshed and non-meshed nodes in the network;
the non-meshed node being further adapted to send to the meshed node a request to associate with the meshed node, wherein the meshed node is adapted to operate as a proxy for the non-meshed node associated therewith to route packets between the associated non-meshed node and at least one of a different non-meshed node and another meshed node in the network.

13. A wireless communication network as claimed in claim 12, further comprising:
a plurality of said meshed nodes, at least one of the plurality of meshed nodes being an intelligent access point, adapted to provide other meshed nodes and non-meshed nodes associated therewith access to another network.

14. A wireless communication network as claimed in claim 13, wherein:
the meshed node is further adapted, upon the non-meshed node becoming associated with the meshed node, to send a message to the intelligent access point with which the meshed node is associated to inform the intelligent access point that the non-meshed node has become associated with the meshed node.

15. A wireless communication network as claimed in claim 14, wherein:
the intelligent access point comprises a table which is updated with information pertaining to the non-meshed device based on the message received from the meshed device.

16. A wireless communication network as claimed in claim 15, wherein:
the message comprises an address of the non-meshed node.

17. A wireless communication network as claimed in claim 13, wherein:
the non-meshed node is further adapted to change its association from the meshed node to a different meshed node that is associated with the intelligent access point, and in response, the intelligent access point is adapted to send message to the meshed node from which the non-meshed node changed its association to inform the meshed node of the change of association.

18. A wireless communication network as claimed in claim 17, wherein: the intelligent access point is adapted to unicast the message to the meshed node from which the non-meshed node changed its association.

19. A wireless communication network as claimed in claim 13, wherein: the non-meshed node is further adapted to change its association from the meshed node to a different meshed node that is associated with a different intelligent access point, and in response, the different intelligent access point is adapted to send message to the intelligent access point from which the reasssociated non-meshed node changed its association to inform the intelligent access point of the change of association.

20. A wireless communication network as claimed in claim 19, wherein:

the intelligent access point comprises a table which is updated to remove information pertaining to the reasssociated non-meshed node based on the message received from the different intelligent access point.

21. A wireless communication network as claimed in claim 12, wherein: the meshed node is adapted, when operating as the proxy for the non-meshed node, to maintain information pertaining to a route between the non-meshed node associated therewith and said at least one of another non-meshed node and another meshed node in the network.

22. A wireless communication network as claimed in claim 21, wherein:

the meshed node is further adapted to maintain information pertaining to other meshed nodes and their respective associated non-meshed nodes as obtained from routing messages.

* * * * *